Sept. 4, 1951 G. L. GRUNDMANN 2,566,832

SYNCHRONIZING CIRCUIT

Filed Dec. 18, 1946

INVENTOR
Gustave L. Grundmann
BY H. S. Grover
ATTORNEY

Patented Sept. 4, 1951

2,566,832

UNITED STATES PATENT OFFICE 2,566,832

SYNCHRONIZING CIRCUIT

Gustave Louis Grundmann, Westmont, N. J., assignor to Radio Corporation of America, a corporation of Delaware Application December 18, 1946, Serial No. 716,893

10 Claims. (Cl. 178—69.5)

Figure 1:
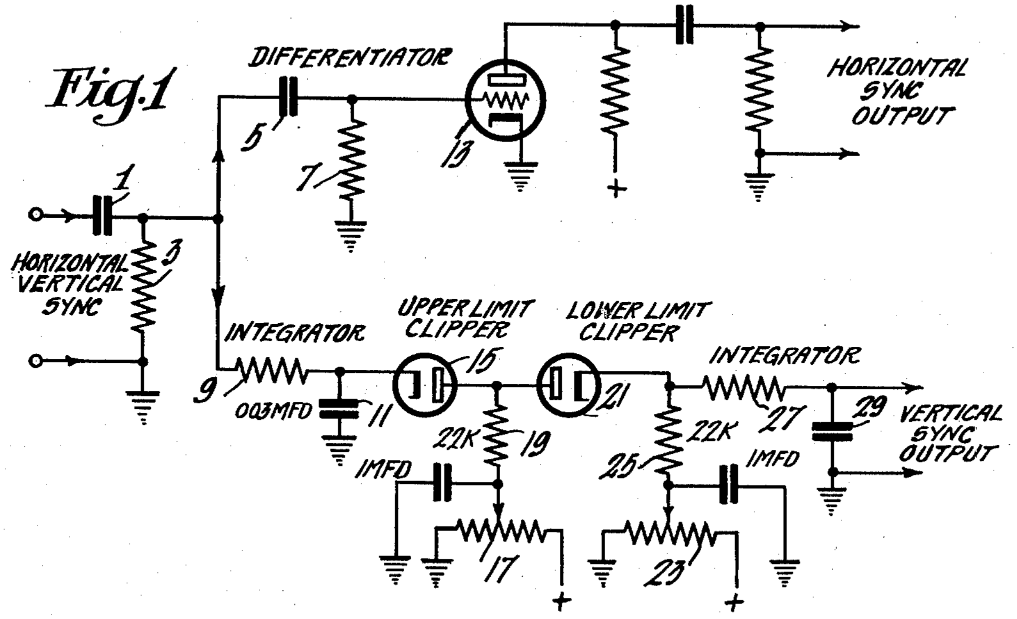

This invention relates to wave form separation circuits and more particularly to improvements in vertical or field synchronization and picture interlace in television systems.

The transmission of the optical images through electrical circuits and systems is somewhat limited by the requirement that a single electrical transmission circuit can carry but one item of information or information representative of a single image elemental area at a time. It is necessary, therefore, to send the image element impulses one after the other in an orderly sequence and at an extremely rapid rate.

Any convenient method of sequence selection may be used, so long as the same sequence is followed both in the transmitter and receiving system. The system almost universally adopted is known as the interlace system of scanning which, of course, requires extremely accurate synchronization information transmission, if pairing of reproduced traces is to be avoided with resultant poor quality of image reproduction.

When the electrical beam in the image reproducing tube has been generated and focused, it is necessary to deflect it over the image area in accordance with the selected scanning raster.

In the scanning operation it is, of course, preferable to employ as nearly as possible a simple pattern, and this may best be accomplished by having a deflection velocity which is uniform. Since deflection is proportional to the deflecting force, linear deflection is obtained by applying a deflecting voltage or current that increases linearly with time. When the end of the scanning motion is reached, the deflecting force must then reverse itself and decrease rapidly to its initial value. The deflecting force must therefore follow a wave shape such as that known as the "saw-tooth" wave.

Systems for the production of sawtooth wave deflecting forces have been employed in television systems and need no detailed description here except to refer to a successful method of producing sawtooth waves of current which is shown and described in an article by Holmes, Carlson and Tolson entitled "Experimental Television System," published in November, 1934, in the "Proceedings of the Institute of Radio Engineers," volume 22, page 1266.

It follows that, in order to have precisely the same scanning operation at the receiving system as is had at the transmitting station, it is necessary to provide a precise system of synchronization by transmitting a characteristic signal together with the signals representative of the image.

Further information concerning scanning sequence, repetition rate, and synchronization may be found, for example, in an article by Kell, Bedford, and Trainer entitled "Scanning Sequence and Repetition Rate of Television Images" published in April, 1936, in the "Proceedings of the Institute of Radio Engineers," volume 24, beginning on page 559.

Synchronizing signals as they are normally employed consist of sharp pulses of voltage applied to the control terminals of an inpulse generator in such a manner that it initiates the generation of an impulse.

It will be remembered that the scanning of an image area requires both a vertical (or field) and a horizontal (or line) system of scanning. The synchronizing signal must therefore be a composite train of signals containing both vertical and horizontal synchronizing pulses.

It follows that at the receiving station there must be facilities for separating the image signals from the composite signal train and for separation of the horizontal from the vertical synchronizing signals.

Two synchronizing signal separation methods have been widely experimented with, amplitude separation and wave form separation. The wave form system has been adopted almost universally throughout the world.

The wave form method of separation of synchronizing signals from the video signals transmitted therewith depends for its operation on the wave form structure of the signals. The horizontal sync signals are sharp, nearly rectangular pulses occurring at the desired line frequency. The vertical impulse has the same amplitude as the horizontal pulses, the difference being that the vertical impulse is prolonged, enduring through the time interval occupied to reproduce three horizontal lines on the traced image raster by present U. S. standards.

The vertical impulse with which this disclosure is most cencerned will be observed in the explanation of the operation of this invention to take, for example, the form of a serrated type of sync impulse.

Separation of the horizontal from the vertical pulses could not be accomplished by amplitude separation, since both sets of pulses have the same amplitude. Instead, circuits must be employed that respond to the difference in the duration of the pulses. Circuits capable of distinguishing differences in wave form are called differentiation and integration circuits.

Although the serrated type of vertical pulse is a complex type of signal and gives reasonably positive synchronizing performance, the results obtained are sometimes irregular due to the effect of the serrations of the synchronizing signal on the integrated signal which is utilized to trigger the cathode ray beam deflection system.

According to this invention, an improved synchronizing signal separation circuit is shown whose operation is more accurate than operation of circuits heretofore known. The interference to the integrated signal caused by the serrated pulses is removed by a limiting or clipping action, followed by a second integrating action.

A primary object of this invention is to provide an improved television system.

Another object of this invention is to provide an improved synchronizing system wherein there is employed a plurality of synchronizing signals.

Figure 2:
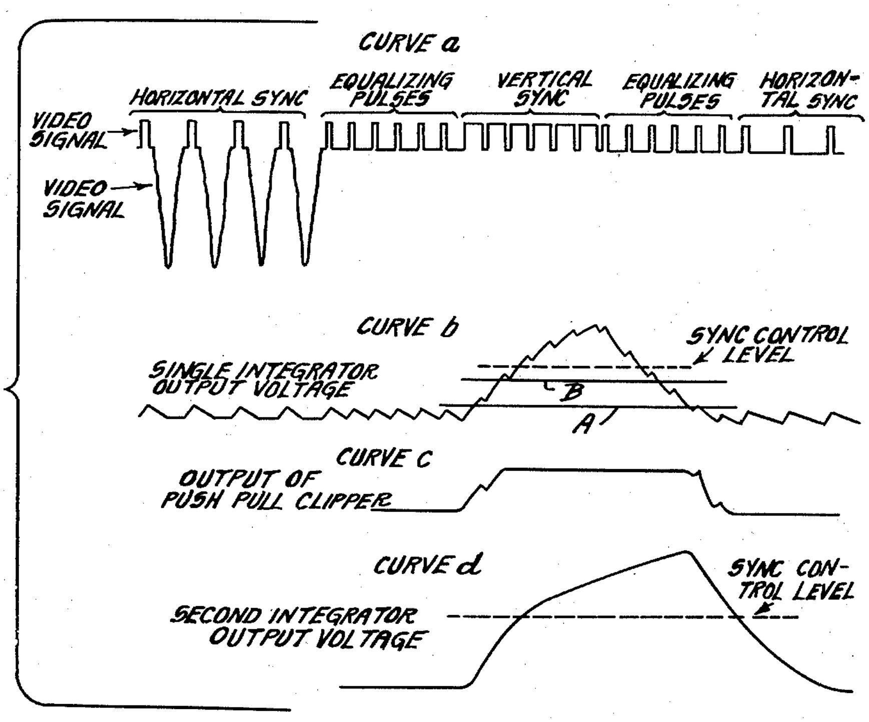

Other and incidental objects of the invention will be apparent to those skilled in the art from a reading of the following specification and an inspection of the accompanying drawing in which Figure 1 illustrates by circuit diagram a preferred form of this invention; and Figure 2 shows graphically the operation of a preferred form of this invention.

Turning now in more detail to Figure 1, there is an input circuit for horizontal and vertical synchronizing signals including an input condenser 1 and a shunt resistor 3.

The signal voltage developed across resistor 3 is divided into two channels, a channel involving a differentiator having a series condenser 5 and a parallel resistor 7, and a channel involving a signal integrating circuit having a series resistor 9 and a parallel condenser 11.

A resistance capacity voltage divider that is designed to distort an input voltage wave shape is known as a differentiator or integrator, depending on the locations of the output terminals. The output signal obtained from the differentiator is taken across the resistance while the output from an integrator is taken across a capacity. Such circuits will change the shape of any complex alternating-voltage wave shape that is impressed on them, and this distortion is a function of the value of the time constant of the circuit as compared to the period of the wave shape. Neither a differentiator nor an integrator can change the shape of a pure sine wave.

Because the operation of integrator and differentiator circuits is well known in the art, it will be sufficient here to say that the short duration horizontal sync signal pulses will be transmitted through the differentiator circuit to tube 13 and thence to the horizontal synchronizing output circuit illustrated in Figure 1.

The longer duration vertical synchronizing pulses are passed by the integrator circuit including resistance 9 and condenser 11 to the upper limit clipper which may take the form of a diode 15.

The electrical charactristics of diode 15 are such that the tube conducts only when the plate is at a positive potential with respect to its associated cathode. If, for example, the cathode is maintained at a predetermined potential, the plate need only be positive with respect to the predetermined potential for current to pass through the diode. A positive potential may be placed on the plate, in which case the tube conducts until such time as the potential of the cathode increases beyond in a positive direction the potential of the plate. It will be seen, therefore, that the series diode limiter illustrated as tube 15 passes signals having an amplitude less than the predetermined bias potential applied to the anode of the diode 15 through the potential source including potentiometer 17 and resistor 19. The rectifying characteristics of the diode 15 are utilized so that it may be considered as a switch. This is justified if the value of resistance 19 is large as compared to the resistance of the diode when conducting. Resistor 19 may have, for example, a resistance of 22,000 ohms, which is large compared with the resistance of diode 15, which is about 500 ohms when conducting.

Although a series diode limiter is shown, an alternate method of employing diodes in parallel rather than in series may be employed.

It is possible to limit both amplitude extremities of an input wave form at any desired level by placing two diodes in parallel or in series in a limiter circuit.

By including a second diode 21 in the circuit and connecting its plate to the plate of diode 15, a lower limit clipper may be provided having an adjustable lower limit obtained through a source of biasing potential including potentiometer 23 and a series resistance 25.

The operation of the lower limit clipper is similar to that of the upper limit clipper. If the signal applied to diode 21 has a potential lower than the potential of the cathode of diode 21, no transmission will result. As the potential of signal increases to and beyond the potential of the cathode of the diode 21, the diode 21 will pass current and so transmit the signal.

A second integrator circuit including a series resistor 27 and a parallel condenser 29 follows the clipper circuits and provides a second integration of the signal for the vertical synchonizing signal output circuit illustrated.

The operation of the lower channel of the circuit diagram shown in Figure 1 may best be accomplished by a reference to the curves shown in Figure 2.

Curve *a* shows a portion of a Radio Manufacturers Association standard T–111 television signal as defined by the Radio Manufacturers Association Television Committee.

At the left end of curve *a* are shown horizontal synchronizing signals together with image or video signals. At the end of the video signals there begins a series of equalizing pulses which are utilized to perform the required timing such that the beginning of the vertical sync signals will have a proper timing relationship for both fields of an interlaced frame.

More information concerning the function of the equalizing pulses may be found beginning on page 161 of a book entitled "Principles of Television Engineering" by Fink, published in 1940, by the McGraw Hill Book Co., Inc.

Curve *b* illustrates the results of a single integration of the signal illustrated in curve *a*.

It will be seen that the synchronizing control level which is illustrated in curve *b* with a dotted line may intersect the integrated signal curve at a point on or near one of the serrations and result in an irregularity of timing.

If, however, the integrated signal is clipped by both an upper limit and a lower limit clipper, as shown in Figure 1, the signal occurring between lines A and B of curve *b* will appear as illustrated in curve *c*.

If the signal shown in curve *c* is again integrated, an output voltage will result, as illustrated in curve *d*, having a substantially smooth curved portion at the position of the synchronizing control level.

It will be seen, therefore, that the timing of the vertical synchronizing signal output will be more regular than if the vertical synchronizing signal output is obtained from a single integrating circuit.

Having thus described the invention, what is claimed is:

1. A synchronizing signal circuit comprising in combination a signal clipper for passing only that portion of a signal between two predetermined amplitudes, said signal clipper having input and output circuits, a signal integration circuit adapted to receive a synchronizing signal, the output of said signal integration circuit being connected to said input circuit, and a second signal integration circuit having its input circuit connected to said output circuit.

2. A system synchronizing circuit comprising in combination a signal clipping system having both an upper limit and a lower limit clipper, said clipping system having input and output circuits, a signal integration circuit adapted to receive an electrical synchronizing signal, the output of said signal integration circuit connected to said clipping system input circuit, and a second signal integration circuit having its input circuit connected to the output circuit of said output circuit.

3. A sync separation circuit comprising in combination a signal integration circuit having input and output circuits and adapted to receive an electrical signal at its input circuit, signal clipping means also having input and output circuits, said clipping means input circuit connected to said signal integration output circuit to remove the upper and lower portion of the signal obtained from said integrating circuit, and a second signal integrating circuit having its input circuit connected to the output circuit of said signal clipping means.

4. A wave form synchronizing signal separation circuit having an input and an output circuit and comprising a pair of serially connected resistive elements connected between said input and output circuits and wherein the connection between said resistive elements includes a pair of diodes whose anodes are connected together and whose cathodes are connected one each to one each of said resistors, means for applying a bias potential to said diode anodes, means for applying a bias potential to one of said diode cathodes, a capacitive element connected between the other of said diode cathodes and a point of fixed potential, and a second capacitive element connected across said output circuit one side of each of said input and output circuits being connected to said point of fixed reference potential.

5. A synchronizing wave form separation circuit having an input and an output circuit and comprising a pair of serially connected resistive elements connected between said input and output circuits and wherein the connection between said resistive elements includes a first and a second diode whose anodes are connected together and whose cathodes are connected one each to one each of said resistors, means for applying a bias potential to said diode anodes, means for applying a bias potential to said second diode cathode, a capacitive element connected between said first diode cathode and a point of fixed potential, and a second capacitive element connected across said output circuit one side of each of said input and output circuits being connected to said point of fixed reference potential.

6. A synchronizing signal dividing circuit comprising a plurality of signal channels, one of said signal channels having a signal clipper for passing only that portion of a signal between two predetermined amplitudes, said signal clipper having input and output circuits, a signal integration circuit adapted to receive an electrical signal, the output circuit of said signal integration circuit connected to said input circuit, a second signal integration circuit having its input circuit connected to said output circuit and means supplying different type synchronizing signals to said channels.

7. A television system horizontal and vertical synchronizing signal separation circuit comprising a horizontal synchronizing signal channel having a signal differentiating circuit, a vertical synchronizing signal channel having a signal clipper for passing only that portion of a signal between two predetermined amplitudes, said signal clipper having input and output circuits, a signal integration circuit adapted to receive an electrical signal, said signal integration circuit having its output circuit connected to said input circuit, a second signal integration circuit having its input circuit connected to said output circuit, and means supplying horizontal and vertical synchronizing signals to said signal channels.

8. A sync separation circuit having an input and an output circuit and comprising a pair of resistive elements connected serially in said circuit and wherein the connection between said resistive elements includes a first and a second diode whose anodes are connected together and whose cathodes are connected one each to one each of said resistors, said diode anodes connected to a first source of positive potential through a first resistive element, said second diode cathode connected to a second source of positive potential through a second resistive element, a capacitive element connected between said first diode cathode and a point of fixed potential, and a second capacitive element connected across said output circuit.

9. A television sync separation circuit having an input and an output circuit and comprising a pair of serially connected resistive elements connected between said input and output circuits and wherein the connection between said resistive elements includes a serially connected first and second diode whose anodes are connected together and whose cathodes are connected one each to one each of said resistors, said diode anodes connected to a first source of positive potential through a first resistive element, said second diode cathode connected to a second source of positive potential through a second resistive element, said second source of positive potential being of lesser value than said first source of positive potential, a capacitive element connected between said first diode cathode and a point of fixed potential, and a second capacitive element connected across said output circuit one side of each of said input and output circuits being connected to said point of fixed reference potential.

10. In a television system, a synchronizing signal separation circuit comprising a plurality of signal channels, one of said signal channels being a horizontal synchronizing signal channel and having a signal differentiating circuit, another of said signal channels being a vertical synchronizing signal channel and having a signal clipper for passing only that portion of a signal between two predetermined amplitudes, said signal clipper having input and output circuits, a signal integration circuit adapted to receive an electrical signal, said signal integration circuit having its output connected to said input circuit, a second signal integration circuit having its input connected to said output circuit and means supplying horizontal and vertical synchronizing signals to said signal channels.

GUSTAVE LOUIS GRUNDMANN.

REFERENCES CITED

The following references are of record in the file of this patent:

UNITED STATES PATENTS

| Number | Name | Date |
|---|---|---|
| 2,277,000 | Bingley | Mar. 17, 1942 |
| 2,292,148 | Moe | Aug. 4, 1942 |
| 2,313,915 | Bedford | Mar. 16, 1943 |
| 2,350,536 | Schlesinger | June 6, 1944 |
| 2,468,059 | Grieg | Apr. 26, 1949 |